United States Patent
Jain et al.

(10) Patent No.: US 12,505,588 B2
(45) Date of Patent: Dec. 23, 2025

(54) SALIENCY-BASED BACKGROUND GENERATION

(71) Applicant: Adobe Inc., San Jose, CA (US)

(72) Inventors: Ajay Jain, San Jose, CA (US); Michele Saad, Austin, TX (US); Irgelkha Mejia, River Edge, NJ (US)

(73) Assignee: Adobe Inc., San Jose, CA (US)

( * ) Notice: Subject to any disclaimer, the term of this patent is extended or adjusted under 35 U.S.C. 154(b) by 191 days.

(21) Appl. No.: 18/369,924

(22) Filed: Sep. 19, 2023

(65) Prior Publication Data

US 2025/0095221 A1   Mar. 20, 2025

(51) Int. Cl.
| | | |
|---|---|---|
| G06T 11/00 | (2006.01) | |
| G06F 40/279 | (2020.01) | |
| G06V 10/774 | (2022.01) | |
| G06V 10/86 | (2022.01) | |

(52) U.S. Cl.
CPC .......... *G06T 11/00* (2013.01); *G06F 40/279* (2020.01); *G06V 10/774* (2022.01); *G06V 10/86* (2022.01)

(58) Field of Classification Search
CPC ....... G06T 11/00; G06F 40/279; G06V 10/86; G06V 10/774
See application file for complete search history.

(56) References Cited

U.S. PATENT DOCUMENTS

| | | | |
|---|---|---|---|
| 8,117,085 B1 | 2/2012 | Smith | |
| 10,235,449 B1 | 3/2019 | Viswanathan et al. | |
| 10,783,398 B1 | 9/2020 | Ranzinger et al. | |
| 2014/0379616 A1 | 12/2014 | Sun et al. | |
| 2017/0372162 A1* | 12/2017 | Wang | G06T 7/11 |
| 2018/0060358 A1 | 3/2018 | Jiang et al. | |
| 2018/0285682 A1* | 10/2018 | Najibi | G06T 7/194 |
| 2019/0050427 A1 | 2/2019 | Wiesel et al. | |
| 2019/0080351 A1 | 3/2019 | Garg et al. | |
| 2019/0318032 A1 | 10/2019 | Vangala et al. | |
| 2019/0392330 A1 | 12/2019 | Martineau et al. | |
| 2021/0368094 A1* | 11/2021 | Li | H04N 23/633 |
| 2022/0101578 A1* | 3/2022 | Bedi | G06T 11/00 |

(Continued)

OTHER PUBLICATIONS

"Adobe Photo Composition", Adobe [retrieved Jul. 11, 2023]. Retrieved from the Internet <https://www.adobe.com/creativecloud/photography/discover/photo-composition.html>., 13 Pages.

(Continued)

*Primary Examiner* — Yu Chen
(74) *Attorney, Agent, or Firm* — FIG. 1 Patents

(57) ABSTRACT

In accordance with the described techniques, a background generation system receives one or more images depicting an object, and textual information describing the object. A generative text model is employed to generate a prompt based on the one or more images and the textual information. Further, a generative image model is employed to generate an output image. To do so, the generative image model generates a background image based on the prompt, and the object is incorporated into the background image. Using a visual saliency model, the background generation system determines a visual saliency defining a degree of fixation on the object within the output image. The background generation system outputs the output image based on the visual saliency meeting a threshold.

20 Claims, 8 Drawing Sheets

(56) References Cited

U.S. PATENT DOCUMENTS

| | | | | |
|---|---|---|---|---|
| 2022/0130078 | A1* | 4/2022 | Maheshwari | G06V 10/56 |
| 2022/0150553 | A1 | 5/2022 | Ravuru et al. | |
| 2022/0188895 | A1 | 6/2022 | Lipka et al. | |
| 2023/0206614 | A1* | 6/2023 | Ku | G06T 11/00 |
| | | | | 382/153 |
| 2024/0135199 | A1* | 4/2024 | Portisch | G06N 5/022 |
| 2024/0153038 | A1* | 5/2024 | Duan | G06V 10/26 |
| 2024/0161258 | A1* | 5/2024 | Maschmeyer | G06T 7/70 |
| 2024/0331007 | A1* | 10/2024 | Japertas | G10L 15/18 |
| 2024/0355019 | A1 | 10/2024 | Assouline et al. | |
| 2024/0362468 | A1* | 10/2024 | Lee | G06N 3/047 |
| 2025/0078361 | A1* | 3/2025 | Narayana | G06T 11/60 |

OTHER PUBLICATIONS

"Canva", Canva [retrieved Jul. 20, 2023]. Retrieved from the Internet <https://www.canva.com/>., 6 Pages.

"Free Background Changer", Everimaging [retrieved Jul. 11, 2023]. Retrieved from the Internet <https://www.fotor.com/features/backgrounds.html>., 6 Pages.

U.S. Appl. No. 17/120,583 , "Final Office Action", U.S. Appl. No. 17/120,583, filed Oct. 5, 2023, 45 pages.

U.S. Appl. No. 17/120,583 , "Non-Final Office Action", U.S. Appl. No. 17/120,583, filed Apr. 17, 2023, 32 pages.

Koehler, Kathryn , et al., "What do saliency models predict?", National Library of Medicine [retrieved Jul. 11, 2023]. Retrieved from the Internet <https://www.ncbi.nlm.nih.gov/pmc/articles/PMC3954044/#:%7E:text=Computational%20models%20of%20saliency%20take,is%20to%20a%20human%20observer>., Mar. 11, 2014, 41 Pages.

Paliarush, Oleksandr , et al., "Geolocation-Based Background Generation for Object Images", U.S. Appl. No. 18/238,749, filed Aug. 28, 2023, 52 pages.

Wang, Yan , et al., "Bio-driven visual saliency detection with color factor", Frontiers Bioeng. Biotechnol., vol. 10 [retrieved Jul. 11, 2023]. Retrieved from the Internet <https://www.frontiersin.org/articles/10.3389/fbioe.2022.946084/full>., Aug. 4, 2022, 13 Pages.

2407566.5 , "Foreign Office Action", GB Application No. 2407566.5, Oct. 4, 2024, 70 pages.

U.S. Appl. No. 17/120,583 , "Non-Final Office Action", U.S. Appl. No. 17/120,583, filed Mar. 1, 2024, 42 pages.

102024118192.3 , "Foreign Office Action", DE Application No. 102024118192.3, Jul. 15, 2024, 7 pages.

U.S. Appl. No. 17/120,583 , "Final Office Action", U.S. Appl. No. 17/120,583, filed Sep. 26, 2024, 49 pages.

\* cited by examiner

SALIENCY-BASED BACKGROUND GENERATION

BACKGROUND

An online publication service is an online resource that enables publishers to create, edit, organize, and otherwise make publications of content available for viewing by consumers of the online publication service. Examples of online publication services include digital marketplace services, video and/or audio streaming services, social media services, article publication services, and the like. Typically, an online publication includes one or more images (e.g., display images) that are viewable by consumers browsing the online publication service. These images are meant to draw the consumers' attention and provide meaningful context for an object or topic of the online publication, thereby enabling the consumers to make quick and informed decisions regarding whether to access a particular publication. Publishers often use non-contextual images (e.g., images with a plain white background) for use in association with online publications, resulting in decreased visitor engagement with the online publications.

SUMMARY

A background generation system is described that is configured to receive multiple images depicting an object, as well as textual information describing the object. In one or more implementations, the multiple images and the textual information are obtained from an online publication of the object published via an online publication service. The textual information is processed using an entity extraction technique to extract one or more entities from a knowledge graph that correspond to the textual information. Further, the multiple images are processed by a tag extraction model that is trained using machine learning to extract image tags describing objects and visual attributes depicted in the multiple images.

The image tags, the textual information, and/or the extracted features are provided as input to a generative text model, which is trained using machine learning to transform unformatted text into text prompts that inform a generative image model how to generate a background image for the object. Accordingly, the generative text model generates a prompt and provides the prompt as input to a generative image model, which is trained using machine learning to generate background images based on the prompt. Upon receiving the prompt and an image of the multiple images, the generative image model generates a background image based on the prompt. Further, an output image is generated by incorporating the object (as depicted in one of the multiple images) into the background image.

Using a visual saliency model, the background generation system determines a visual saliency defining a degree of fixation on the object within the output image. Furthermore, the background generation system compares the visual saliency to a visual saliency threshold. The generative image model is again leveraged to generate a different output image based on the prompt responsive to the visual saliency being below the visual saliency threshold. However, the output image is output (e.g., for rendering in a user interface) if the visual saliency meets or exceeds the visual saliency threshold.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
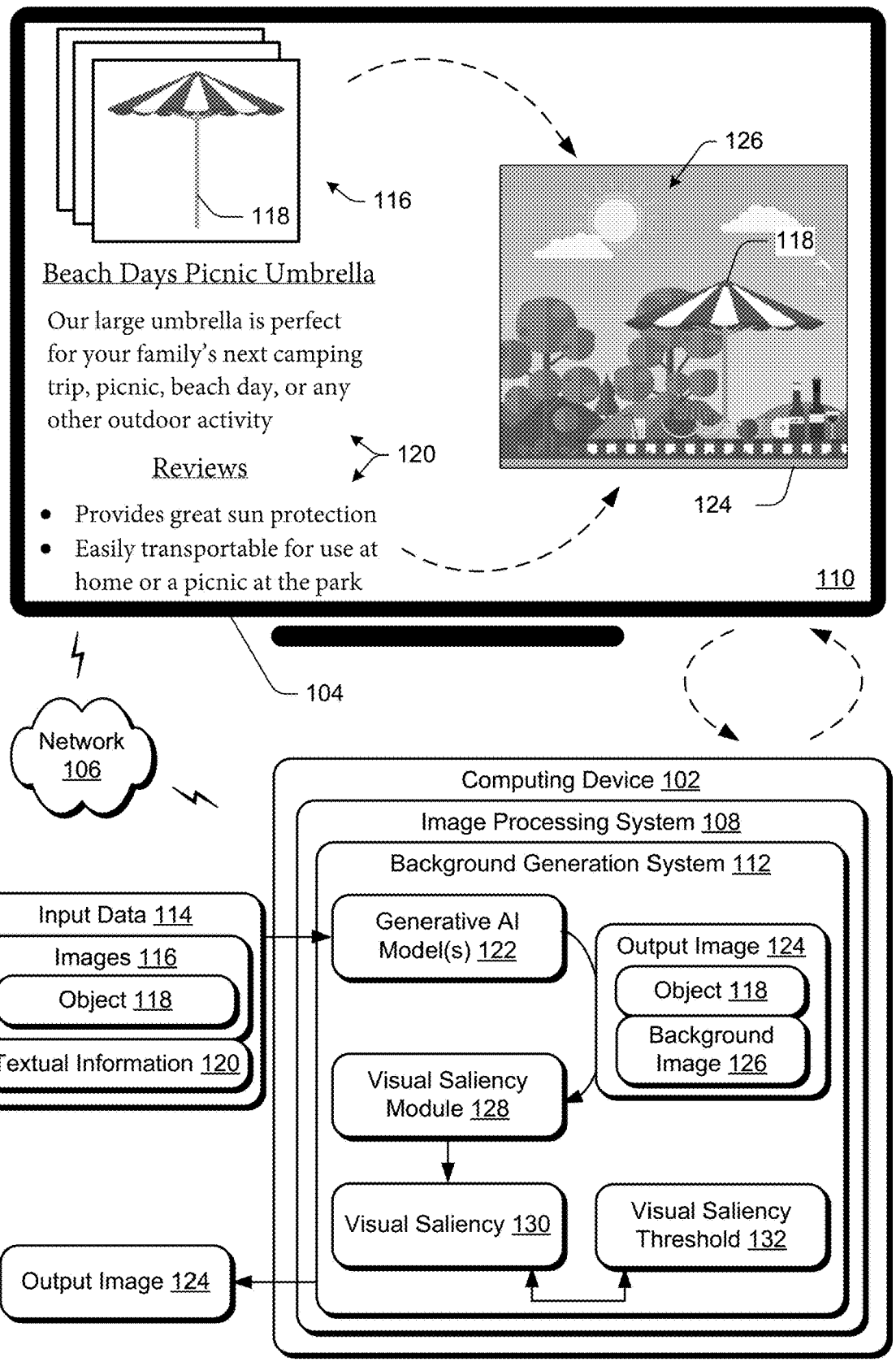
FIG. 1 is an illustration of an environment in an example implementation that is operable to employ techniques described herein for saliency-based background generation.

Online publication services enable online publications of content to be made available by publishers and accessed by consumers. Generally, online publications include display photos that are viewable by consumers browsing content via the online publication service. In the context of a digital marketplace service, for example, a product listing (e.g., an online publication) includes one or more display images. These display images are meant to provide contextual information surrounding an object that is the subject of an online publication, and also demonstrate the visual features of the object.

Conventional techniques for automatic background generation, however, fail to consider a visual saliency of the object as part of the background image, resulting in background images that distract from, rather than highlight, the visual features of the object that is the subject of the publication. Additionally, conventional automatic background generation techniques fail to leverage the extensive contextual data that is available as part of an online publication, resulting in generated background images that have minimal relevance to the object's intended usage, intended demographics, and the like. While manual background generation techniques produce acceptable results for experienced and skilled users, the process of manually generating background images is time-consuming and tedious in nature, particularly for novice users of such techniques.

To overcome the limitations of conventional techniques, techniques for saliency-based background generation are described herein. In accordance with the described techniques, a computing device (e.g., of a service provider system) is communicatively coupled to a client device. The service provider system provides an underlying infrastructure to manage execution of digital services, including an online publication service. Broadly, the online publication service employs a background generation system, which is configured to generate background images for online publications of content. In the following example, the online publication service is described in the context of a digital marketplace service, but it is to be appreciated that the background generation system is implementable in conjunction with any one or more of a wide variety of online publication services.

In response to receiving a notification indicating that a user of the online publication service requests to access a publication, the background generation system aggregates input data. As part of this, the background generation system, in one or more examples, retrieves user data describing the user that requests to access the publication from a database of the online publication service. In various examples, the user data includes behavioral data describing the user's interactions with the online publication service, recommendations and preferences of the user, and segments of users to which the user belongs.

In addition, the background generation system retrieves textual information from the publication indicated by the notification. The textual information, for instance, includes a variety of information that a publisher provides as part of creating or editing the publication, such as usages of the object, descriptions (e.g., titles and/or summaries) of the object, categories of objects to which the object belongs, attributes of the object, and demographics the object is intended for. Additionally or alternatively, the textual information includes one or more open-ended text inputs provided by consumers accessing the publication via the online publication service, such as comments and/or reviews posted to a comments section and/or a reviews section of the publication.

Moreover, the background generation system in one or more instances retrieves a plurality of images currently being used (e.g., as display images) in association with the publication indicated by the notification. In one or more implementations, the background generation system includes a tag extraction model, which is a machine learning model pre-trained to extract image tags from images. By way of example, the image tags are text descriptors of objects and/or visual attributes depicted in the images. As part of aggregating the input data, the background generation system processes the plurality of images using the tag extraction model. As a result, the aggregated input data includes images currently being used in association with the publication, the textual information of the publication, user data of a user requesting to access the publication, and the image tags.

In accordance with the described techniques, a feature extraction module receives the text-based input data, e.g., the textual information, the image tags, and the user data. The feature extraction module employs a knowledge graph, which is a network of entities (e.g., objects, events, situations, concepts, etc.) that includes associations between the entities. The associations connect different entities in the knowledge graph and describe how the entities are related. Given this, the feature extraction module queries the knowledge graph with the text-based input data, and employs an entity extraction technique to extract features from the knowledge graph that correspond to the text-based input data. The extracted features include, for example, one or more entities in the knowledge graph that match contiguous portions of text in the text-based input data.

Additionally or alternatively, a usage generation model receives the text-based input data, and generates a predicted usage of the object based on the text-based input data. Broadly, the usage generation model is trained using supervised learning on groupings of training data. Each respective grouping of training data includes one or more training image tags extracted from one or more training images of a publication, training textual information retrieved from the publication, and a ground truth usage of the object of the publication that is curated by a publisher of the publication. In particular, the usage generation model learns to predict usages for products by comparing the ground truth usages of publications to predicted usages generated by the usage generation model based on the training contextual information and the training image tags.

One or more of the extracted features, the predicted usage, and the unprocessed text-based input data are provided as input to a generative text model. The generative text model, for example, is a machine learning model that is trained to take unformatted text as input, and transform the unformatted text to a text prompt that is suitable for prompting a generative image model to generate a background for the object. Accordingly, the generative text model generates a prompt based on the extracted features, the predicted usage, and/or the unprocessed text-based input data.

Once generated, the prompt is forwarded to the generative image model along with one of the display images of the publication for which the background image is to be generated. The generative image model, for example, is a machine learning model that is trained to receive an image and a prompt as input, and generate an output image that includes the object as depicted in the image with a new background based on the prompt. To do so, the generative image model generates a background image based on the prompt, and the background generation system incorporates the object, as depicted in the received image, into the background image.

The generative image model provides the generated output image to a visual saliency module, which is configured to determine a visual saliency of the object within the output image. To do so, the visual saliency module employs a machine learning model pre-trained to output visual saliency maps for received images. A visual saliency map, for instance, is configurable as a grayscale image in which degrees of brightness in the visual saliency correspond to degrees of fixation (e.g., of the human eye) on corresponding portions of the output image. Thus, to determine the visual saliency of the object within the output image, the visual saliency module compares an amount of brightness in a region of the visual saliency map corresponding to the object to an amount of brightness outside the region of the visual saliency map.

The visual saliency is further compared to a visual saliency threshold. If the visual saliency of the object does not satisfy the threshold, the generative image model is again leveraged to generate a new output image based on the text prompt. If, however, the visual saliency of the object does satisfy the threshold, the background generation system outputs the output image. For example, the background generation system communicates the generated output image to the client device of the user indicated by the notification. In response, the client device renders the publication including the generated output image, rather than the unprocessed display images.

Conventional background generation techniques often generate background images on the basis of just one image without leveraging the extensive contextual information that is available via online publications. In contrast, the described background generation system leverages image tags, the user data, and the textual information alongside the knowledge graph to inform one or more generative machine learning models for the background generation task. As a result, the background generation system generates background images with increased relevance to the object of the publication, and increased relevance to the user for which the background image is being generated, as compared to conventional techniques.

Further, in contrast to conventional techniques that fail to account for visual saliency, the described techniques analyze output images for visual saliency and solely output the output images that satisfy a visual saliency threshold. By doing so, the background generation system ensures that the output images do not distract from the object that is the subject of the publication. For at least these reasons, webpages hosting online publications that include output images generated by the background generation system experience increased website traffic and visitor engagement, as compared to conventional background images. Additionally, the described techniques automate the laborious process of manually generating background images, which conserves computational resources and improves computational efficiency for computing devices implementing the background generation system.

Term Descriptions

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, a machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "online publication service" refers to a digital service made available to users of a service provider system. The online publication service enables functionality for users to create, author, and edit online publications of content, submit comments and/or reviews to online publications of content, and the like. Examples of online publication services include digital marketplace services, online video publication services, media streaming services, and online article publication services, to name just a few. In the context of a digital marketplace, an online publication refers to a listing of a product for sale via the digital marketplace and includes various display images showing the product. In the context of a video publication service, an online publication refers to a video published for viewing by users of the video publication service and includes thumbnail images displaying an object or topic of the video.

As used herein, the term "knowledge graph" refers to a network of entities (e.g., objects, events, situations, concepts, etc.) that are connected via associations that illustrate how connected entities are related. In the context of an online publication service, the knowledge graph is built to include entities and associations that are related to the online publication service provided. In an example in which the online publication service is an online marketplace, for instance, the entities include products that are bought and sold via the online marketplace, attributes of the products, brands of the products, usages of the products, demographics that the products are intended for, and so on. Continuing with this example, the associations connect products to attributes of products, indicate categorical relationships between products and categories/brands, connect products to intended demographics for the products, connect products to intended usages of the products, and so on.

As used herein, the term "entity extraction" refers to a text analysis technique that uses natural language processing (NLP) to extract entities from the knowledge graph that correspond to text provided as input to the knowledge graph. By way of example, the knowledge graph is queried with unstructured input text, and using entity extraction, contiguous portions of the input text that match entities in the knowledge graph are identified. In one or more implementations, entity extraction pulls entities from the knowledge graph that match the contiguous portions of input text, as well as one or more additional entities to which the matched entities are connected.

As used herein, the term "visual saliency map" refers to a grayscale image that identifies portions of an input image that the human eye tends to fixate on. In particular, degrees of brightness within a visual saliency map correspond to degrees of fixation on corresponding portions of the input image. By way of example, brighter portions in the visual saliency map indicate locations in the image having a relatively higher degree of fixation, as compared to darker portions in the visual saliency map. To generate a visual saliency map, a pre-trained machine learning model receives an image as input, and outputs a visual saliency map.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Saliency-Based Background Generation Environment

FIG. 1 is an illustration of an environment 100 in an example implementation that is operable to employ techniques described herein for saliency-based background generation. The illustrated environment 100 includes a computing device 102 and a client device 104 that are communicatively coupled, one to another, via a network 106. The computing device 102 and/or the client device 104 are configurable in a variety of ways. For instance, the computing device 102 and/or the client device 104 are configurable as a desktop computer, a laptop computer, a mobile device (e.g., assuming a handheld configuration such as a tablet or mobile phone as illustrated), and so forth. Thus, the computing device 102 and/or the client device 104 range from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 7.

The computing device 102 is illustrated as including an image processing system 108. The image processing system 108 is implemented at least partially in hardware of the computing device 102 to process and transform digital images. Such processing includes creation of the digital images, modification of the digital images, and rendering of the digital images in a user interface 110 for output, e.g., by a display of the client device 104. Although illustrated as implemented locally at the computing device 102, functionality of the image processing system 108 is also configurable as whole or part via functionality available via the network 106, such as part of a web service or "in the cloud."

An example of functionality incorporated by the image processing system 108 to process the digital images is illustrated as a background generation system 112. As shown, the background generation system 112 receives, as input data 114, multiple images 116 depicting an object 118 and textual information 120 describing the object 118. In one or more implementations, the input data 114 is obtained from an online publication of the object 118 made available via an online publication service. In the illustrated example, for instance, a listing (e.g., a publication) of an umbrella (e.g., the object 118) is offered for sale via an online marketplace (e.g., an online publication service). Further, the listing includes multiple images 116 depicting the umbrella as well as textual information 120 describing the umbrella, e.g., a title of the umbrella, a description of the umbrella, and reviews of the umbrella.

The input data 114 is provided to one or more generative artificial intelligence (AI) models 122. Broadly, the generative AI models 122 are leveraged to generate an output image 124 depicting the object 118 against a background that is different from a background depicted in the images 116 and relevant to the object's intended usage(s), intended demographics, and so on. To do so, the generative AI models 122 generate a background image 126 for the object 118 based on the input data 114. Further, the background generation system 112 generates the output image 124 by incorporating the object 118, as depicted in one of the images 116, into the background image 126. The output image 124 is then provided to a visual saliency module 128, which processes the output image 124 to determine a visual saliency 130 of the object 118 within the output image 124. By way of example, the visual saliency 130 is a numerical representation of an estimated degree of fixation of the human eye on the object 118 within the output image 124, as compared to the remainder of the output image 124.

In accordance with the described techniques, the background generation system 112 compares the visual saliency 130 to a visual saliency threshold 132. If the visual saliency 130 is below the visual saliency threshold 132, the generative AI models 122 are again leveraged to generate a different output image 124 based on the input data 114. If, however, the visual saliency 130 meets or exceeds the visual saliency threshold 132, the output image 124 is output, e.g., for display in the user interface 110 of the client device 104. As shown in the illustrated example, for instance, the generated output image 124 depicts the umbrella (e.g., the object 118) against a background image 126 showing the umbrella being used in the context of an outdoor picnic.

Oftentimes, users of online publication services choose to publish non-contextual images (e.g., images with a plain white background as depicted in the illustrated example) to represent objects of online publications. These types of images fail to provide meaningful context with respect to the depicted object's usage, intended demographics, and other contextual factors. The choice to publish such non-contextual images is due to the laborious nature of manually generating background images for objects in combination with the fact that conventional automatic background generation techniques fail to produce relevant results that highlight an object's salient features.

In contrast, the background generation system 112 outputs images having a relevant background image 126 based on a variety of input data 114 describing contextual information surrounding the object 118. In addition, the images output by the background generation system 112 do not distract from the object 118 by way of filtering the output images 124 based on the visual saliency 130 and the visual saliency threshold 132. For these reasons, webpages hosting online publications that include output images 124 generated by the background generation system 112 experience increased website traffic and visitor engagement, as compared to conventionally-generated background images. Moreover, the described techniques automate the tedious and time-consuming process of manually generating background images, which conserves computational resources and improves computational efficiency on the computing device 102.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Background Generation Features

Figure 2:
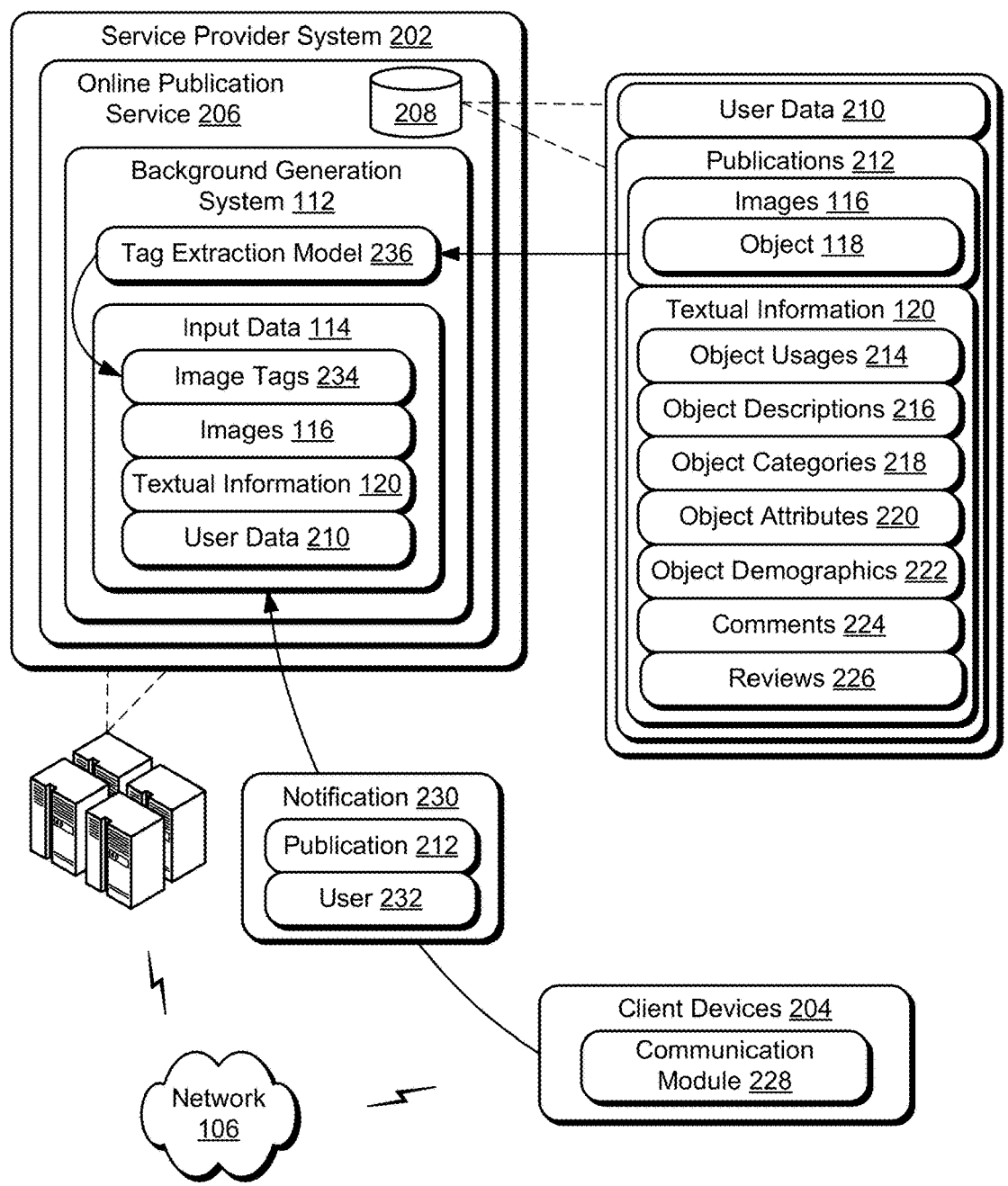
FIG. 2 depicts a system in an example implementation showing operation of a background generation system to aggregate input data.

FIG. 2 depicts a system 200 in an example implementation showing operation of a background generation system 112 to aggregate input data 114. The system 200 includes a service provider system 202 and a plurality of client devices 204 that are communicatively coupled, one to another, via the network 106. Computing devices that implement the service provider system 202 and the client devices 204 are configurable in a variety of ways, as further discussed above with reference to FIG. 1. By way of example, the service provider system 202 includes or corresponds to the computing device 102 of FIG. 1, and the client devices 204 include the client device 104 of FIG. 1.

Broadly, the service provider system 202 provides and manages access to digital services "in the cloud" that are accessible by the client devices 204 via the network 106. More specifically, the service provider system 202 provides an underlying infrastructure to manage execution of digital services, e.g., through control of underlying computational resources. Digital services can take a variety of forms, including but not limited to social media services, document management services, storage services, media streaming services, content creation services, productivity services, digital marketplace services, and so on. In some instances, the digital services include an online publication service 206 for creating and/or editing online publications, submitting comments and/or reviews regarding the online publications, and so on.

As shown, the online publication service 206 includes a variety of information maintained in storage 208, and this information includes user data 210 for each different user of the online publication service 206. By way of example, the user data 210 of a respective user includes behavioral data associated with the respective user, recommendations and preferences of the respective user, and segments to which the respective user belongs.

The behavioral data, for instance, includes a search history of the respective user via the online publication service 206, online publications that have been accessed by the respective user, accessed publications that have resulted in conversion of a predefined objective, e.g., initiating a purchase of an online listing in an online marketplace environment, subscribing to a publisher of the online publication, and the like. The recommendations and preferences of the respective user, for instance, describe the categories of publications that the respective user tends to access, e.g., based on a user profile indicating user-specified recommendations and preferences, and/or by analyzing the behavioral data. Further, the segments define particular demographic attributes that the user and other similar users fall under, e.g., the respective user is in a segment of users between the ages of thirty and forty, another segment of users that includes mothers, and another segment of users having a particular range of income, etc.

As previously noted, the online publication service 206 provides functionality for creating, editing, accessing, and commenting on online publications 212, which are also illustrated as maintained in the storage 208. As shown, each respective publication 212 includes multiple images 116 depicting a particular object 118 that is the subject of the respective publication 212. In the context of an online marketplace, therefore, the publications 212 include images 116 depicting an object 118 that is listed for sale via the online marketplace. In the context of a video streaming service, the publications 212 include thumbnail images 116 depicting an object 118 that is the subject of a published video. In an example in which a published video is an instructional video for building a deck, the thumbnail images 116 include the deck as depicted in a frame of the published video, for instance.

Each of the publications 212 further include a variety of textual information 120. In various implementations, the textual information 120 includes object usages 214, object descriptions 216, object categories 218, object attributes 220, and/or object demographics 222. As part of publishing a publication 212 of an object 118, for instance, a publisher is prompted to provide intended usages of the object 118, a title and/or brief description of the object 118, one or more categories to which the object 118 belongs, one or more attributes of the object 118, and one or more demographics the object 118 is intended for. Although depicted as including object usages 214, object descriptions 216, object categories 218, object attributes 220, and object demographics 222, it is to be appreciated that, in various scenarios, one or more of the depicted textual information 120 categories are omitted.

Example object usages 214 for an umbrella include "picnics," "patio table," "beach days," and "outdoors." Example object descriptions 216 for an umbrella include a title of the publication 212, such as "Beach Days Picnic Umbrella," and/or a brief description of the object 118, such as "our large umbrella is perfect for your family's next camping trip, picnic, beach day, or any other outdoor activity." Example object categories 218 for an umbrella include "beach equipment," "picnic equipment," "backyard equipment," and "weather protection." Example object attributes 220 for an umbrella include "lightweight," "packable," "foldable," and "water resistant." Example object demographics 222 for an umbrella include "adults," "families," and "heads of households."

Additionally or alternatively, the textual information 120 includes comments 224 and/or reviews 226 posted to a comment section and/or review section of a publication 212. The comments 224 and/or reviews 226 are posted by consumers that have viewed and/or interacted with the publication 212, as opposed to publishers that create and/or edit the publication 212. The comments 224 and/or reviews 226 express, for example, questions regarding the object 118 posed by the consumers, usages or experiences associated with the object 118 and resulting in a positive sentiment toward the object 118, usages or experiences associated with the object 118 and resulting in a negative sentiment toward the object 118, and the like. It is to be appreciated that the textual information 120 is not limited to the examples depicted and described herein, and instead, the textual information 120 includes additional and/or different information without departing from the described techniques.

As shown, the client devices 204 include a communication module 228 having functionality to send communications, such as notifications 230 to the service provider system 202 over the network 106. In one or more implementations, the notification 230 is communicated to the background generation system 112 in response to a user requesting to access a publication 212 of the online publication service 206. Further, the notification 230 includes an indication of the user 232 (e.g., a user profile) that is requesting to access the publication 212, as well as an indication of the publication 212 being accessed.

In response to receiving the notification 230, the background generation system 112 aggregates input data 114 specific to the publication 212 being accessed, and the user 232 accessing the publication. To do so, in one or more examples, the background generation system 112 retrieves, from the storage 208, the user data 210 associated with the user 232 indicated by the notification 230. In addition, the background generation system 112 retrieves, from the storage 208, the images 116 and the textual information 120 of the publication 212 indicated by the notification 230.

As part of aggregating the input data 114, the background generation system 112 performs a pre-processing step on the images 116 to generate image tags 234 that represent the images 116 textually in various implementations. To do so, the background generation system 112 employs a tag extraction model 236, which is a machine learning model that is pre-trained to receive images 116 as input, and output image tags 234 that correspond to or include text descriptors of objects 118 and/or visual attributes depicted in the images 116. In one or more examples, the visual attributes include profiles or angles from which the object 118 is shown in the images 116, lighting conditions in the images 116, and so on. In the context of machine learning, a machine learning model has been pre-trained when it has undergone training to accomplish a specific task. Any one of a variety of public or proprietary pre-trained machine learning models are employable by the background generation system 112 to generate the image tags 234, one example of which is a VGG-16 model.

Figure 3:
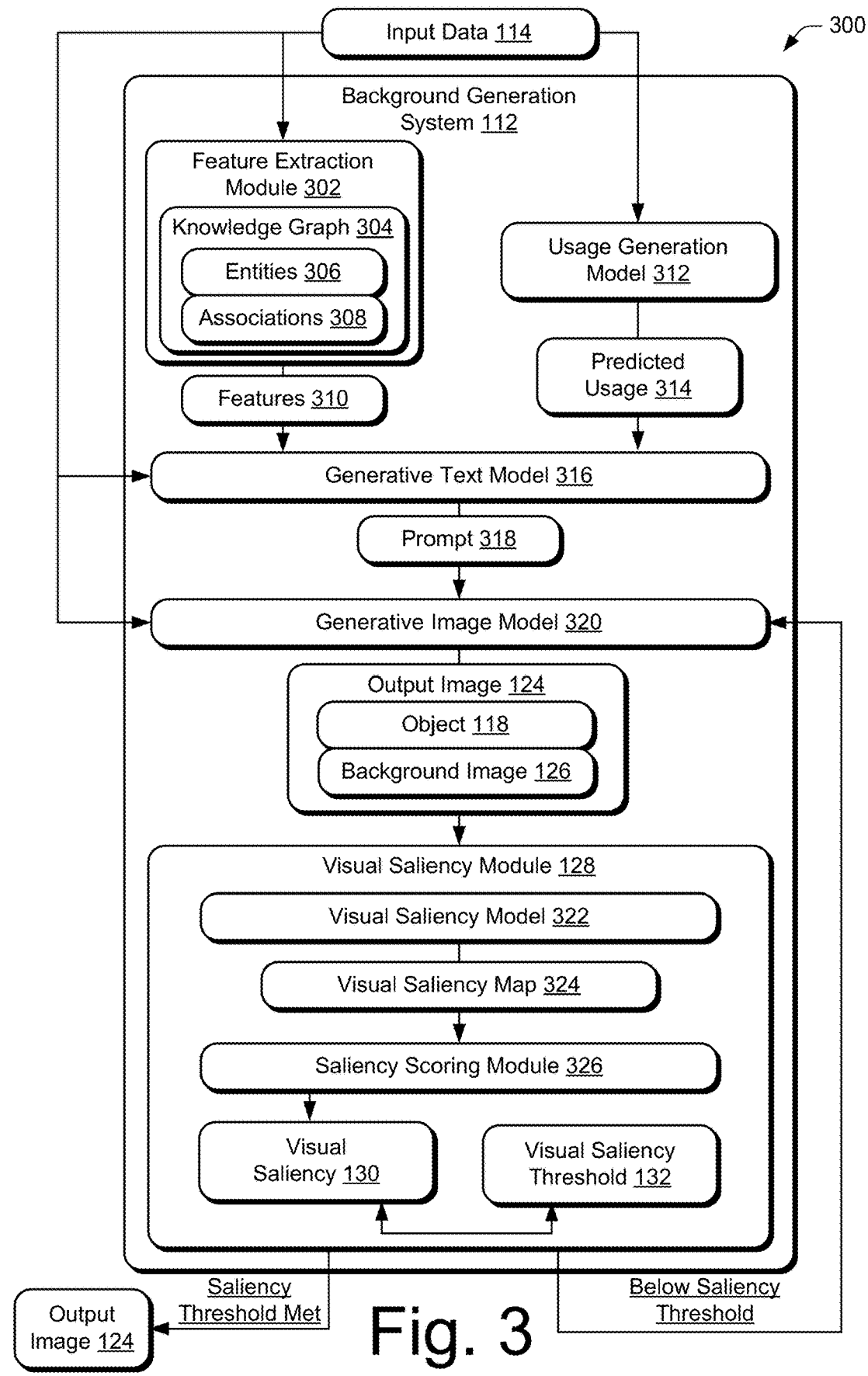
FIG. 3 depicts a system in an example implementation showing operation of a background generation system to generate an output image based on visual saliency.

FIG. 3 depicts a system 300 in an example implementation showing operation of a background generation system 112 to generate an output image 124 based on visual saliency. As shown, the background generation system 112 receives the input data 114, e.g., responsive to receiving the notification 230. As previously mentioned, the input data 114 includes the user data 210 of the user 232 requesting to access a publication 212, the images 116 and the textual information 120 of the publication 212 being accessed, and/or image tags 234 extracted from the images 116 by the tag extraction model 236.

In accordance with the described techniques, the input data 114 (e.g., the textual information 120, the user data 210, and/or the image tags 234) is provided as input to a feature extraction module 302. The feature extraction module 302 includes a knowledge graph 304 (also known as a semantic network), which is a network of entities 306 that includes associations 308 that connect different entities 306 and describe how the connected entities 306 are related. By way of example, an entity 306 "umbrella" and the entity 306 "picnics" are connected by a usage association 308 in the knowledge graph 304, i.e., the umbrella is "used for" picnics. Broadly, the feature extraction module 302 queries the knowledge graph 304 with the input data 114, and employs an entity extraction technique to identify entities 306 from the knowledge graph 304 that correspond to the input data 114.

As previously mentioned, the knowledge graph 304 is built for a particular online publication service 206 for which the background generation system 112 is implemented in various implementations. One example of building a knowledge graph 304 including entities 306 and associations 308 that are specific to an online publication service 206 is described in U.S. patent application Ser. No. 17/120,583 to Lipka et al., the entire disclosure of which is incorporated by reference in its entirety.

Using the entity extraction technique, the feature extraction module 302 outputs features 310 including one or more of the entities 306 that match contiguous portions of text in the input data 114 and/or one or more additional entities 306 to which the matching entities 306 are connected in the knowledge graph 304. In an example, the feature extraction module 302 identifies the term "umbrella" that is present as an entity 306 in the knowledge graph 304, and in the input data 114. Further, the entity 306 "umbrella" is connected via an association 308 to the entity 306 "patio table." In this example, the feature extraction module 302 outputs, as the features 310, the entity 306 "umbrella" and the entity 306 "patio table" despite the phrase "patio table" not occurring in the input data 114.

In one or more implementations, the feature extraction module 302 is leveraged for extracting features 310 from comments 224 and/or reviews 226 associated with positive sentiments. In one example, the reviews 226 are associated with a numerical rating, e.g., on a scale of one to five stars. In this example, the knowledge graph 304 is queried with the reviews 226 of the publication 212 having a numerical rating that is above a threshold. For instance, the feature extraction module 302 queries the knowledge graph 304 with the reviews 226 having a numerical rating of four stars or five stars, while disregarding the reviews 226 having a numerical rating of three stars or fewer.

In one or more additional examples, the feature extraction module 302 leverages a sentiment analysis technique to process the comments 224 and/or reviews 226. Broadly, sentiment analysis uses natural language processing (NLP) to determine whether text is associated with a positive, neutral, or negative sentiment. Using the sentiment analysis technique, the feature extraction module 302 queries the knowledge graph 304 with the comments 224 and reviews 226 or portions of the comments 224 and the reviews 226 that are associated with positive sentiments. Further, the feature extraction module 302 disregards the comments 224 and reviews 226 that are associated neutral or negative sentiments.

As shown, the input data 114 is further provided as input to a usage generation model 312. Broadly, the usage generation model 312 is a machine learning model trained using supervised learning to generate predicted usages 314 based on the input data 114. During model inference, the usage generation model 312 receives, as conditioning, the textual information 120 and the image tags 234 of a publication 212. Further, the usage generation model 312 outputs a predicted usage 314 based on the conditioning. In this way, the predicted usage 314 is influenced by the depicted attributes in the images 116 of the publication 212 (e.g., as reflected in the image tags 234) as well as the described attributes of the object 118 of the publication 212 (e.g., as reflected in the textual information 120). Training of the usage generation model 312 is further discussed below with reference to FIG. 5.

Moreover, a generative text model 316 receives, as input, the features 310, the predicted usage 314, and/or the unprocessed input data 114. In particular, the unprocessed input data 114 received by the generative text model 316 includes the image tags 234, the textual information 120, and/or the user data 210. Broadly, the generative text model 316 is a machine learning text-to-text model that is trained to take unformatted text as input, and output a prompt 318 that is suitable for background image generation by a generative image model 320. Notably, the generative text model 316 and the generative image model 320 collectively form the generative AI models 122 of FIG. 1.

In one or more implementations, the feature extraction module 302 extracts the features 310 from unstructured, open-ended text inputs (e.g., the object descriptions 216, the comments 224, and the reviews 226). These sources of input data 114 are unstructured or open-ended in the sense that the information in these sources of input data 114 is not associated with a particular context or topic. Once processed by the feature extraction module 302, the features 310 are then provided, as conditioning, to the generative text model 316.

In accordance with these implementations, structured sources of input data 114 are directly provided to the generative text model 316, i.e., without any pre-processing done on the input data 114. The structured sources of the input data 114, for example, include sources of the input data 114 provided by a publisher as part of creating or editing a publication 212 (e.g., the object usages 214, the object categories 218, the object attributes 220, and the object demographics 222), and the user data 210. These sources of input data 114 are structured in the sense that the textual data is associated with a topic or context. By way of example, an object usage 214 that is included as part of the publication 212 includes text that is within the context of a usage of the object 118 that is the subject of the publication 212.

In one or more implementations, the features 310 extracted from the open-ended text inputs, as well as the structured sources of unprocessed input data 114 are filtered before being provided to the generative text model 316 as conditioning. By way of example, the background generation system 112 implements a scoring algorithm that assigns relevance scores to terms or phrases of the features 310 and the structured input data 114. As part of this, the scoring algorithm increases relevance scores for terms or phrases that are both (1) present in the structured sources of the unprocessed input data 114, and (2) extracted as features 310 from the open-ended text inputs. Additionally or alternatively, the scoring algorithm increases relevance scores for terms or phrases occurring with increased frequency in the input data 114, e.g., including the open-ended text inputs and the structured sources of the input data 114. Given this, the background generation system 112 conditions the generative text model on a reduced subset of the features 310 and/or terms or phrases in the structured sources of unprocessed input data 114 having the highest relevance scores.

In one non-limiting training example, the generative text model 316 is a pre-trained large language model that is fine-tuned using supervised learning to generate prompts 318 that are suitable for the background generation task. Any one of a variety of public or proprietary large language models are employable by the background generation system 112, examples of which include T5, GPT-3, GPT-3.5, and GPT-4 models, to name just a few. In particular, the generative text model 316 is trained on pairs of training data including sets of curated input data and corresponding target prompts. During the training process, the generative text model 316 is conditioned on the curated input data. Further, the generative text model 316 outputs a prompt 318 in accordance with the described techniques.

The generative text model 316 is trained by comparing the generated prompt 318 to the corresponding target prompt. By way of example, the generated prompt 318 and the target prompt are converted to vectors using a text vectorization technique (e.g., Term Frequency-Inverse Document Frequency (TF-IDF), Word2Vec, and GloVe), and compared using a similarity metric (e.g., cosine similarity or Euclidean distance). Parameters of the generative text model 316 are iteratively updated based on degrees of similarity between the generated prompt 318 and the target prompt on different pairs of training data.

In accordance with the described techniques, the generative image model 320 receives the prompt 318 and the input data 114 as input. In particular, the input data 114 provided to the generative image model 320 is an image 116 depicting the object 118 for which the background image 126 is to be generated. Broadly, the generative image model 320 is a machine learning text-to-image model that is trained to receive a prompt 318 and an image 116 as input, and generate an output image 124 having a new background that is based on the prompt 318. To do so, the generative image model 320 generates a background image 126 based on the prompt 318. Further, the generative image model 320 replaces a background (as depicted in the image 116) with the background image 126, thereby incorporating the object (as depicted in the image 116) into the background image 126.

To incorporate the object 118 as depicted in the selected image 116 into the background image 126, the background generation system 112 generates an object image by separating the object 118 from the selected image 116. In an example in which the selected image 116 includes a background, for instance, the object image has the background removed, i.e., the object image depicts the object 118 having a plain white background. Further, the generative image model 320 fills the plain white background of the object image with the background image 126, e.g., in accordance with an in-painting approach. Notably, the object image filled with the background image 126 is the output image 124.

In one or more implementations, the generative image model 320 is trained to fill the background image 126 in such a way that the object 118 is placed in an appropriate location based on content depicted in the background image 126, as further discussed below. In an example in which the object 118 is a soccer ball, for instance, the generative image model 320 generates a background image 126 including a person in the act of kicking. In this example, the content of the background image 126 (e.g., the person in the act of kicking) is positioned relatively to the soccer ball such that the soccer ball is appropriately sized in relation to the person, and appropriately positioned in a location within the background image 126 to be kicked by the person. Additionally or alternatively, the generative image model 320 adjusts the size of the soccer ball and/or the positioning of the soccer ball within the background image 126.

In one or more implementations, the background generation system 112 selects, from among multiple images 116, the image 116 for which the background image 126 is to be generated based on the features 310 and/or the image tags 234. By way of example, the knowledge graph 304 connects objects 118 to optimal angles, profiles, and lighting conditions for viewing the objects 118 in a way that demonstrates the salient features of the objects 118. Thus, the feature extraction module 302 extracts the angles, profiles, and lighting conditions as features 310 during the entity extraction process. Further, as previously discussed, angles, profiles, and lighting conditions are examples of the image tags 234 that are extractable by the tag extraction model 236.

Given this, the background generation system 112 selects the image 116 based on image tags 234 being extracted from the image 116 and defining angles, profiles, and/or lighting conditions that correspond to the optimal angles, profiles, and lighting conditions extracted as features 310 from the knowledge graph 304. Additionally or alternatively, the background generation system 112 selects the image 116 based on a frequency of occurrence of the angles, profiles, and lighting conditions in the image tags 234 extracted from the image 116. By way of example, the background generation system 112 selects the image 116 having a threshold number or percentage of frequently occurring angles, profiles, and lighting conditions across the image tags 234 extracted from each of the images 116.

In one non-limiting training example, the generative image model includes a pre-trained text-to-image model that is fine-tuned using supervised learning to generate background images 126 for objects. Any one of a variety of public or proprietary text-to-image models are employable by the background generation system 112, examples of which include DALL-E and DALL-E 2. In particular, the generative image model 320 is trained on triplets of training data each including an object image depicting an object, a prompt, and a target image. Notably, the target image includes a curated background for the object based on the prompt, and the object appropriately positioned within the background. During the training process, the generative image model 320 is conditioned on an object image and a prompt of a respective triplet. As output, the generative image model 320 generates an output image 124 by generating a background image 126 based on the prompt of the respective triplet, and replacing the background (as depicted in the object image of the respective triplet) with the background image 126.

The generative image model 320 is trained by comparing the generated output image 124 to the target image of the respective triplet. By way of example, the generated output image 124 and the target image are provided as input to an image encoder, which encodes the output image 124 and the target image as vectors. The vector representative of the output image 124 and the vector representative of the target image are then compared using a similarity metric (e.g., cosine similarity or Euclidean distance). Parameters of the generative image model 320 are iteratively updated based on degrees of similarity between the generated output image 124 and the target image on different triplets of training data. Accordingly, the generative image model 320 learns to generate background images 126 based on received prompts 318, and to appropriately position content of the background images relative to objects 118 depicted in received images 116.

As shown, the output image 124 is provided, as input, to a visual saliency module 128, which includes a visual saliency model 322. Broadly, a visual saliency model 322 is a machine learning model that is pre-trained to take an image 116 as input, and output a visual saliency map 324 of the image 116. As previously mentioned, degrees of brightness within the visual saliency map 324 correspond to degrees of fixation on corresponding portions of the image 116. Any one of a variety of public or proprietary visual saliency models 322 are usable by the background generation system 112 to generate visual saliency maps 324, one example of which is described by Zhou et al., *APNet: Adversarial Learning Assistance and Perceived Importance Fusion Network for All-Day RGB-T Salient Object Detection*, IEEE Transactions on Emerging Topics in Computational Intelligence, 957-968 (2021).

In accordance with the described techniques, the output image 124 is provided as input to the visual saliency model 322, which outputs a visual saliency map 324 of the output image 124. Further, a saliency scoring module 326 receives the visual saliency map 324, and determines a visual saliency 130 that defines a degree of fixation on the object 118 within the output image 124. As part of this, the saliency scoring module 326 identifies a region within the visual saliency map 324 that corresponds to the object 118, and determines a degree of fixation within the region. To do so, the saliency scoring module 326 determines an amount of brightness within the region of the visual saliency map 324. By way of example, the saliency scoring module 326 determines the amount of brightness in the region by adding brightness intensity values (e.g., ranging from 0 to 255) of each pixel in the region of the visual saliency map 324. The saliency scoring module 326 similarly determines the amount of brightness in the entire visual saliency map 324.

Given this, the degree of fixation on the object 118 within the output image 124 is representable as a percentage or ratio of the amount of brightness within the region of the visual saliency map 324 to a total amount of brightness in the visual saliency map 324. In an example, the visual saliency 130 of the object 118 within the output image 124 is 87%, meaning that the human eye will fixate on the object 118 rather than the background 87% of the time. Thus, the visual saliency 130 output by the saliency scoring module 326 is based on a comparison of a first degree of fixation within the region of the output image 124 that includes the object 118 to a second degree of fixation outside the region of the output image 124, e.g., the background image 126.

After the visual saliency 130 is determined, the visual saliency module 128 compares the visual saliency 130 to a visual saliency threshold 132. By way of example, the visual saliency threshold 132 defines a minimum value for the visual saliency 130 that is to be achieved in order for the output image 124 to be output by the background generation system 112. Thus, if the visual saliency 130 satisfies the visual saliency threshold 132, the output image 124 is output, e.g., by integrating the output image 124 into a publication 212 for display in a user interface of the client device 204 requesting to access the publication 212. If the visual saliency 130 does not satisfy the visual saliency threshold 132, however, the visual saliency module 128 instructs the generative image model 320 to generate a different output image 124.

For example, the generative image model 320 is again conditioned on the prompt 318 and the selected image 116 depicting the object 118. Further, the generative image model 320 generates a different output image 124 by generating a different background image 126 based on the prompt 318, and replacing the background of the selected image 116 with the different background image 126, e.g., thereby incorporating the object into the different background image 126. In accordance with the described techniques, the visual saliency module 128 determines the visual saliency 130 of the object 118 within the different output image 124, and compares the visual saliency 130 to the visual saliency threshold 132. This process is repeated until an output image 124 is generated that has a visual saliency 130 that satisfies the visual saliency threshold 132.

Although the foregoing examples are depicted and described within the context of generating a background for an object 118 depicted in an image 116, it is to be appreciated that the described image generation techniques are implementable in different contexts without departing from the spirit or scope of the described techniques. Examples of such different contexts include foreground object generation as well as a combination of background image generation and foreground object generation.

In an example of foreground object generation, the generative text model 316 generates a prompt 318 (e.g., based on the features 310, the input data 114, and/or the predicted usage 314) that informs the generative image model 320 to generate an object. In addition, the generative image model 320 receives a background image and the prompt 318 as input, and the generative image model 320 generates an output image 124 by generating an image of the object based on the prompt 318, and incorporating the image of the object into the received background image. Further, the visual saliency 130 of the generated object within the received background is evaluated in accordance with the techniques described herein.

In an example of a combination of background image generation and foreground object generation, the generative text model 316 generates a prompt 318 (e.g., based on the features 310, the input data 114, and/or the predicted usage 314) that informs the generative image model 320 to generate an image including a background and an object. Moreover, the generative image model 320 receives solely the prompt 318 as input, and the generative image model 320 generates an output image 124 that includes the object and the background specified textually by the prompt 318. Further, the visual saliency 130 of the generated object within the generated background is evaluated in accordance with the techniques described herein.

Figure 4A:
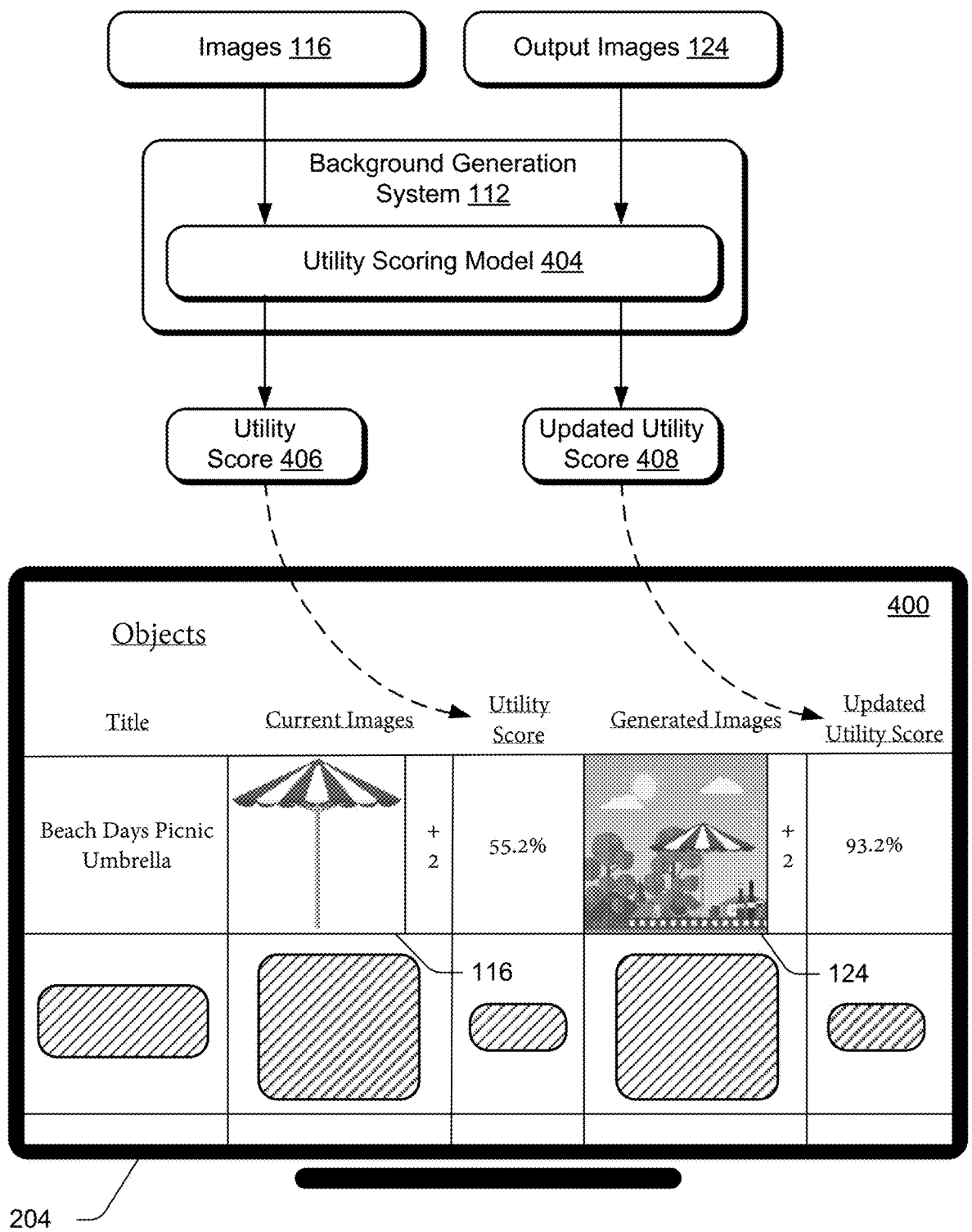
FIGS. 4a and 4b depict example user interfaces for displaying output images generated by a background generation system.
Figure 4B:
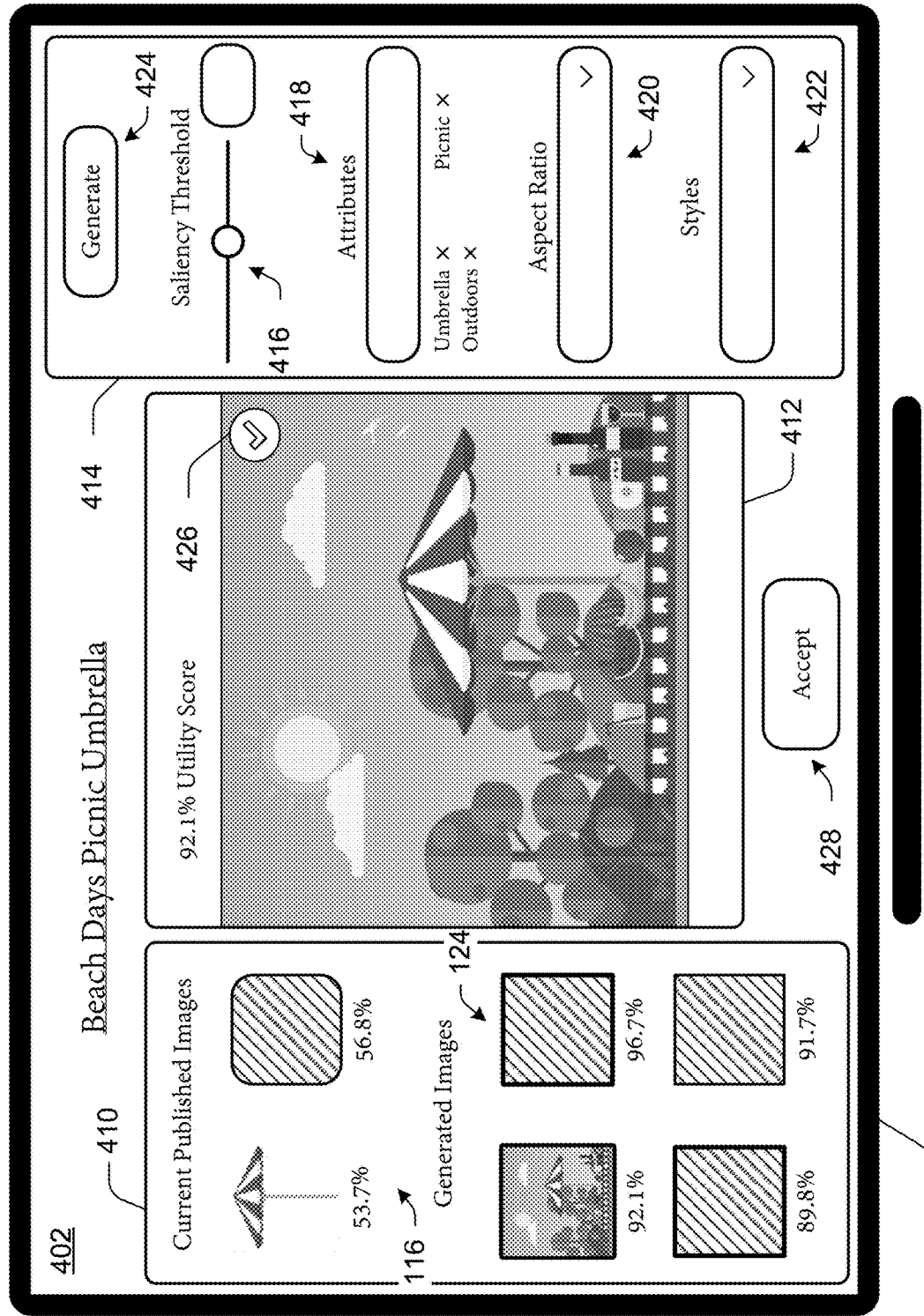

FIGS. 4a and 4b depict example user interfaces 400, 402 for displaying output images 124 generated by a background generation system 112. In the depicted examples, one or more output images 124 have been generated for a publication 212 in accordance with the techniques discussed herein. However, the output images 124 are not generated responsive to receiving the notification 230 indicating that the user 232 is requesting to access the publication 212. Given this, the output images 124 are generated on the basis of aggregated user data 210 of a plurality of users that have accessed the publication 212, rather than user data 210 of a particular user that is currently requesting to access the publication 212.

Here, the background generation system 112 outputs the generated output images 124 for display in the user interface 400 of a client device 204 associated with a publisher of the publication 212. As shown, the user interface 400 includes a table having various information associated with one or more publications 212 that have been published via the online publication service 206 by the publisher. For example, the depicted table includes a title of a publication 212 "Beach Days Picnic Umbrella," one or more unprocessed images 116 currently being used in association with the publication 212, and one or more output images 124 generated by the background generation system 112 for the publication 212. Here, the generated output images 124 are not currently integrated into the publication 212, but rather, are displayed as candidates for replacing or supplementing the one or more images 116 currently integrated into the publication 212.

As shown, the background generation system 112 includes a utility scoring model 404, which is machine learning model trained to generate utility scores for images. The utility scores capture a degree to which the received images influence predefined objectives of the online publication service 206. During training, the utility scoring model 404 receives groupings of training data, each of which including one or more images associated with a publication 212, and publication interaction data describing user interactions with the publication 212 via the online publication service 206. In at least one example, the publication interaction data includes rates at which predefined objectives are converted by users of the online publication service 206. By way of example and not limitation, the predefined objectives include user accesses of the publication 212 (e.g., clicks), subscriptions to a publisher of the publication 212, initiations of purchase of the object 118 via the publication 212 (in the case of an online marketplace), to name just a few.

Based on associations between the publication interaction data and the visual attributes of the images of the publication 212, the utility scoring model 404 uses unsupervised learning to learn the visual attributes that influence the predefined objectives, and the visual attributes that deter the predefined objectives. Given this, parameters of the utility scoring model 404 are updated to generate increased utility scores for images including the visual attributes that influence the predefined objectives. In addition, the parameters of the utility scoring model 404 are updated to generate decreased utility scores for images that deter the predefined objectives. In one or more implementations, the visual saliencies 130 of the images impact the utility scores generated by the utility scoring model 404, e.g., the utility scoring model 404 increases utility scores generated for images having increased visual saliencies 130, and vice versa.

Here, the utility scoring model 404 generates a utility score 406 based on the images 116 currently being used in association with the publication 212 (and optionally the visual saliencies 130 of the images 116 as determined by the visual saliency module 128). Similarly, the utility scoring model 404 generates an updated utility score 408 based on the output images 124 generated by the background generation system 112 (and optionally the visual saliencies 130 for the output images 124). Furthermore, the background generation system 112 communicates the utility score 406 and the updated utility score 408 to the client device 204 for display in the user interface 400.

In accordance with the described techniques, the example user interface 402 of FIG. 4b is displayed in response to a user input selecting the output image 124 displayed in the example user interface 400 of FIG. 4a. As shown in FIG. 4b, the example user interface 402 includes a first panel 410, a second panel 412, and a third panel 414. Further, the first panel 410 displays the images 116 currently being used in association with the publication 212. Additionally, the first panel 410 displays the output images 124 automatically generated by the background generation system 112 as candidates for replacing or supplementing the images 116 for use in association with the publication 212. As shown in the illustrated example, each respective image (e.g., including the images 116 and the output images 124) includes a visual indication of a utility score for the respective image as generated by the utility scoring model 404. In response to a user input selecting one of the output images 124, the selected output image 124 is rendered for display in the larger display area of the second panel 412.

As shown, the third panel 414 includes a plurality of user interface controls for specifying parameters usable by the background generation system 112 to generate the output images 124. In particular, the third panel 414 includes a user interface element 416 that is manipulable to adjust the visual saliency threshold 132 that is to be satisfied in order for the background generation system 112 to output an output image 124.

In addition, the third panel 414 includes a user interface element 418 that is manipulable to update the attributes used by the background generation system 112 to condition the generative text model 316 for prompt generation. The user interface element 418 includes attributes (e.g., "Umbrella," "Picnic," "Outdoors,") that have been identified automatically by the background generation system 112. These attributes, for example, include one or more of the features 310 extracted from the input data 114, one or more unprocessed portions of the input data 114, one or more of the image tags 234, and/or the predicted usage 314. Each of the automatically identified attributes are selectable (e.g., as illustrated by the "x" proximate the attributes) to remove a respective attribute from consideration by the generative text model 316. Moreover, the user interface element 418 includes a search bar that is manipulable (e.g., via text input) to specify additional attributes for consideration by the generative text model 316.

Additionally, the third panel 414 includes a user interface element 420 that is manipulable to specify an aspect ratio for the output images 124, and a user interface element 422 that is manipulable to specify one or more styles for the output images 124. The styles that are specifiable by the user interface element 422 include, for example, a degree of realism for the output images 124 (e.g., photorealistic images or cartoon images), color schemes for the output images 124, and the like. The third panel 414 additionally includes a user interface element 424 that is selectable to instruct the background generation system 112 to generate a new output image 124 in accordance with the updated parameters specified via the third panel 414. In response to receiving user input selecting the user interface element 424, for instance, the client device 204 communicates the updated parameters to the background generation system 112, which generates a new output image 124 in accordance with the techniques discussed herein based on the updated parameters. The new output image 124 is communicated back to the client device 204, which renders the new output image 124 for display in the first panel 410 and/or the second panel 412.

As shown, the output image 124 displayed in the second panel 412 includes a user interface element 426 that is selectable to designate the output image 124 for integration into the publication 212. Although not depicted, the images (e.g., including the images 116 and the output images 124) in the first panel 410 include similar user interface elements in variations. In the example user interface 402, the designated set of output images 124 are visually distinguished in the first panel 410 by borders surrounding the designated output images 124.

The example user interface 402 additionally includes a user interface element 428 that is selectable to accept the designated output images 124, and integrate the designated output images 124 into the publication 212. Indeed, in response to a user input selecting the user interface element 428, the client device 204 communicates the designated set of output images 124 to the service provider system 202. In response, the service provider system 202 updates the publication 212 to include the designated set of output images 124, rather than the unprocessed images 116.

Figure 5:
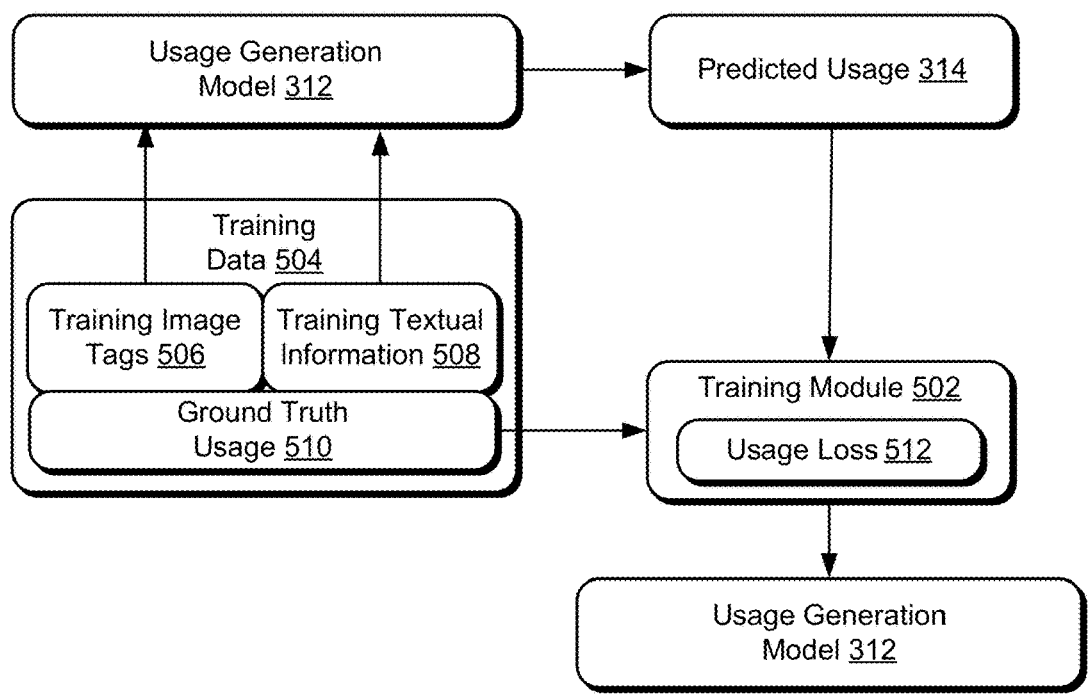
FIG. 5 depicts a system in an example implementation showing operation of a training module to train a usage generation model.

FIG. 5 depicts a system 500 in an example implementation showing operation of a training module 502 to train a usage generation model 312. During a training stage, the usage generation model 312 receives training data 504 as input. As shown, a grouping of training data 504 includes training image tags 506, training textual information 508, and a ground truth usage 510. The training image tags 506 and the training textual information 508 include the same or similar information as the image tags 234 and the textual information 120. By way of example, the training image tags 506 are generated by retrieving training images from an online publication 212 of an object 118, and extracting the training image tags 506 from the training images using the tag extraction model 236. Further, the training textual information 508 is retrieved from the online publication 212. In one or more implementations, the ground truth usage 510 is a curated usage of the object 118 generated by a user of the online publication service 206 that published the publication 212.

As shown, the training image tags 506 and the training textual information 508 are provided as input to the usage generation model 312. The usage generation model 312 is configured to generate a predicted usage 314 based on the training image tags 506 and the training textual information 508 in accordance with the techniques discussed herein. Furthermore, the predicted usage 314 along with the ground truth usage 510 are received by the training module 502. Broadly, the training module 502 uses supervised learning to train the usage generation model 312 to generate predicted usages 314 that accurately reflect the ground truth usages 510.

In particular, the training module 502 uses a text vectorization technique (e.g., Term Frequency-Inverse Document Frequency (TF-IDF), Word2Vec, or GloVe) to convert the predicted usage 314 and the ground truth usage 510 into vectors representative of the predicted usage 314 and the ground truth usage 510, respectively. To determine the usage loss 512, the training module 502 applies a similarity metric (e.g., cosine similarity or Euclidean distance) to the vector representative of the predicted usage 314 and the vector representative of the ground truth usage 510.

After the usage loss 512 is computed, the training module 502 adjusts parameters of the usage generation model 312 to minimize the usage loss 512. These parameters are iteratively adjusted on different groupings of the training data 504 until the usage loss 512 converges to a minimum, a threshold number of iterations have completed, or a threshold number of epochs have been processed. After this, the usage generation model 312 is deployed by the background generation system 112 to generate predicted usages 314 that are used for conditioning the generative text model 316 for prompt generation.

In one or more implementations, the background generation system 112 makes use of a plurality of machine learning models that are pre-trained and/or fine-tuned for a specific task, such as the tag extraction model 236, the generative text model 316, and the generative image model 320. These models are further adjustable using machine learning techniques to refine the tasks performed by these models based on one or more objectives for which the pre-trained machine learning models are deployed.

During deployment of the machine learning models 236, 316, 320, output images 124 are generated by the background generation system 112, and integrated into respective publications 212. To refine the machine learning models 236, 316, 320, the training module 502 observes publication interaction data describing user interactions with the publications 212 that include the output images 124 generated by the background generation system 112. The publication interaction data, for example, includes rates at which the one or more objectives are converted by users of the online publication service. By way of example, the one or more objectives include user accesses of the publication 212 (e.g., clicks), subscriptions to a publisher of the publication 212, initiating a purchase of the object 118 via the publication (in the case of an online marketplace), and so on.

In one or more implementations, the training module 502 refines the machine learning models 236, 316, 320 using reinforcement learning based on the publication interaction data. To do so, the training module 502 determines a first rate at which the one or more objectives occur for the publication 212 for the publication 212 that includes the unprocessed images 116, e.g., the rate before the publication 212 was modified to include the generated output images 124. Furthermore, the training module 502 compares the first rate to the rate at which the one or more objectives occur for the publication 212 that includes the generated output images 124, e.g., the rate after the publication 212 was modified to include the generated output images 124.

In particular, the training module 502 positively reinforces the machine learning models 236, 316, 320 based on the output images 124 causing a threshold amount of increase in the rate at which the one or more objectives occur. In contrast, the training module 502 negatively reinforces the machine learning models 236, 316, 320 based on the output images 124 causing a decrease (or an increase by less than the threshold amount) in the rate at which the one or more objectives occur. Accordingly, the machine learning models 236, 316, 320 learn to generate outputs that influence the one or more objectives of the online publication service 206.

Example Procedures

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Figure 6:
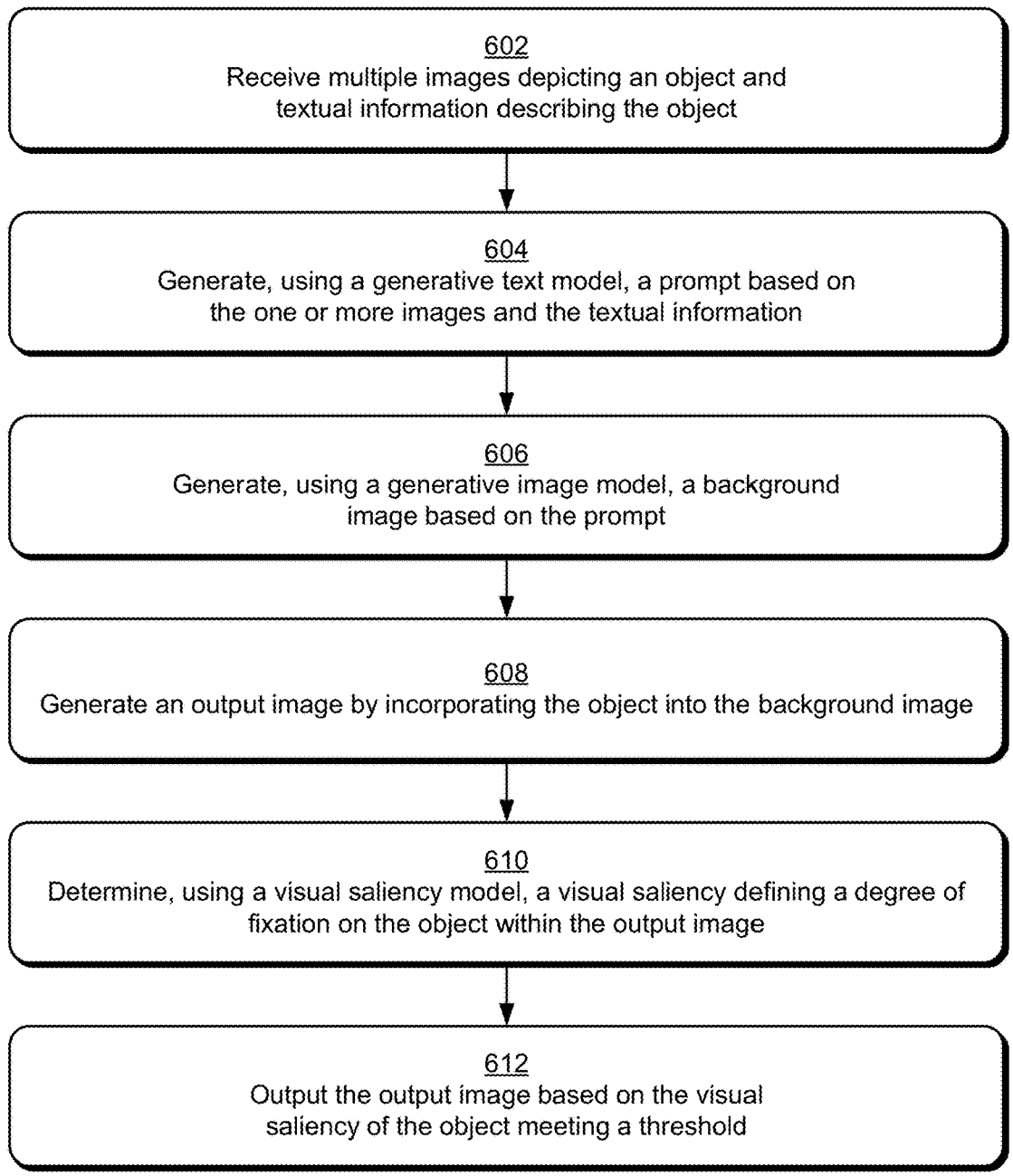
FIG. 6 is a flow diagram depicting a procedure in an example implementation for saliency-based background generation.

FIG. 6 is a flow diagram depicting a procedure 600 in an example implementation for saliency-based background generation. Multiple images depicting an object and textual information describing the object are received (block 602). By way of example, the background generation system 112 obtains input data 114 including multiple images 116 depicting an object 118, and textual information 120 describing the object 118. In one or more implementations, the background generation system 112 aggregates the input data 114 responsive to receiving a notification 230 from a client device 204 indicating that a user 232 of the online publication service 206 is requesting to access a publication 212 of the online publication service 206.

To do so, the background generation system 112 retrieves, from storage 208 of the online publication service 206 (e.g., a database), the images 116 and the textual information 120 associated with the publication 212 indicated by the notification 230. The textual information 120 includes one or more of the object usages 214, the object descriptions 216, the object categories 218, the object attributes 220, the object demographics 222, the comments 224, and the reviews 226. Furthermore, the background generation system 112 employs the tag extraction model 236 to extract the image tags 234 from the retrieved images 116. Additionally or alternatively, the background generation system 112 retrieves, from the storage 208 of the online publication service 206, the user data 210 describing the user 232 indicated by the notification 230. Accordingly, the aggregated input data 114 includes the images 116, the image tags 234, the textual information 120, and/or the user data 210.

A prompt is generated using a generative text model based on the one or more images and the textual information (block 604). By way of example, the feature extraction module 302 receives the input data 114 and queries the knowledge graph 304 with the input data 114 including the textual information 120, the image tags 234, and the user data 210. Using an entity extraction technique, the feature extraction module 302 extracts features 310 from the knowledge graph 304 that correspond to the input data 114. Additionally or alternatively, the usage generation model 312 generates a predicted usage 314 for the object 118 based on the input data 114 including the image tags 234 and the textual information 120. The generative text model 316 receives, as conditioning, one or more of the features 310, one or more terms or phrases from the unprocessed input data 114, and/or the predicted usage 314. As output, the generative text model 316 generates a prompt 318 to be provided to the generative image model 320 for the background generation task.

A background image is generated using a generative image model based on the prompt (block 606), and an output image is generated by incorporating the object into the background image (block 608). By way of example, the generative image model 320 receives the prompt 318 and an image 116 depicting the object 118. In accordance with the described techniques, the generative image model 320 generates a background image 126 based on the prompt 318. Further, generative image model 320 replaces the background (as depicted in the image 116) with the generated background image 126, thereby incorporating the object into the background image 126.

A visual saliency defining a degree of fixation on the object within the output image is determined using a visual saliency model (block 610). By way of example, a visual saliency model 322 receives the output image 124, and outputs a visual saliency map 324 of the output image 124. The visual saliency map 324 is provided as input to a saliency scoring module 326, which outputs a visual saliency 130 of the object 118 within the output image 124. The visual saliency 130 of the object 118 defines a degree of fixation on a region of the output image 124 including the object 118, in relation to a degree of fixation outside the region of the output image 124, e.g., the background.

The output image is output based on the visual saliency of the object meeting a threshold (block 612). By way of example, the visual saliency module 128 compares the visual saliency 130 to the visual saliency threshold 132. Based on the visual saliency threshold 132 being satisfied, the background generation system 112 outputs the output image 124. In one or examples, the background generation system 112 does so by communicating the output image 124 to a client device 104 from which the notification 230 was received. In response, the client device 104 renders the publication 212 having the generated output image 124, rather than the unprocessed images 116.

Example System and Device

Figure 7:
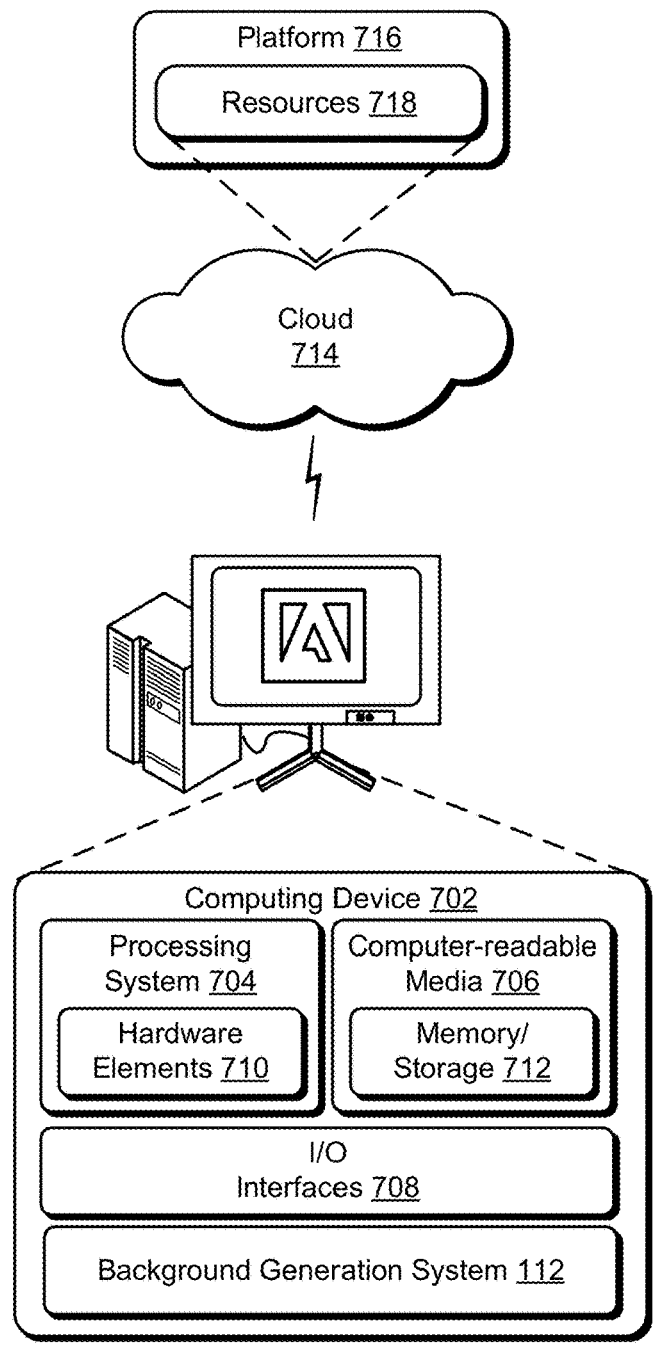
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the background generation system 112. The computing device 702 is configurable, for example, as a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality is also implementable all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

What is claimed is:

1. A method, comprising:
receiving, by a processing device, one or more images depicting an object and textual information describing the object;
generating, by the processing device and using a generative text model, a prompt based on the one or more images and the textual information;
generating, by the processing device and using a generative image model, a background image based on the prompt;
generating, by the processing device, an output image by incorporating the object into the background image;
determining, by the processing device and using a visual saliency model, a visual saliency defining a degree of fixation on the object within the output image;
outputting, by the processing device, the output image based on the visual saliency meeting a threshold; and
generating, by the processing device and using the generative image model, a new background image for the object based on the visual saliency falling below the threshold.

2. The method of claim 1, wherein the receiving the one or more images and the textual information includes obtaining the one or more images and the textual information from an online publication of the object, the textual information including one or more of categories to which the object belongs, usages of the object, demographics the object is intended for, descriptions of the object, and reviews of the object.

3. The method of claim 2, the method further comprising obtaining, by the processing device and from a database of an online publication service hosting the online publication, user data describing one or more attributes of a user responsive to receiving a notification indicating that the user is requesting to access the online publication via the online publication service, the prompt generated based on the user data.

4. The method of claim 1, wherein the generating the prompt includes:
querying a knowledge graph with the textual information, the knowledge graph indicating associations between entities; and
extracting, using an entity extraction technique, one or more entities from the knowledge graph that correspond to the textual information, the prompt generated based on the one or more entities.

5. The method of claim 1, wherein the generating the prompt includes extracting image tags from the one or more images by processing the one or more images using a tag extraction model, the prompt generated based on the image tags.

6. The method of claim 1, wherein the generating the prompt includes generating, using a usage generation model, a usage of the object based on the one or more images and the textual information, the prompt generated based on the usage.

7. The method of claim 6, further comprising:
receiving, by the processing device, training data including one or more training images depicting a training object, training textual information describing the training object, and a ground truth usage of the training object;
generating, by the processing device and using the usage generation model, a predicted usage of the training object based on the one or more training images and the training textual information; and training, by the processing device, the usage generation model by comparing the predicted usage to the ground truth usage.

8. The method of claim 1, wherein the incorporating the object into the background image includes:
generating an object image by separating the object from an image of the one or more images; and
filling a background of the object image with the background image, the filled object image corresponding to the output image.

9. The method of claim 8, wherein the filling the background of the object image includes positioning content of the background image relative to the object.

10. The method of claim 1, wherein the determining the visual saliency includes:
generating, using the visual saliency model, a saliency map of the output image;
determining, using the saliency map, a first degree of fixation on a region of the output image that includes the object, and a second degree of fixation outside the region of the output image; and
determining the visual saliency of the object as a comparative measurement of the first degree of fixation relative to the second degree of fixation.

11. The method of claim 1, further comprising generating, by the processing device, a different output image by generating, using the generative image model, the new background image based on the prompt, and incorporating the object into the new background image, the different output image generated based on the visual saliency falling below the threshold.

12. The method of claim 1, further comprising:
receiving, by the processing device, a request to access a publication including the object and the textual information from a client device; and
outputting, by the processing device, the output image to the client device for display as part of the publication in response to determining that the visual saliency meets the threshold.

13. The method of claim 1, further comprising receiving user input setting the threshold.

14. A system, comprising:
a processing device; and
a computer-readable medium storing instructions that, responsive to execution by the processing device, cause the processing device to perform operations including:
receiving multiple images depicting an object;
extracting, using a tag extraction model, image tags from the multiple images;
generating, using a generative text model, a prompt based on the image tags;
generating, using a generative image model, a background image based on the prompt;
generating an output image by incorporating the object into the background image;
determining, using a visual saliency model, a visual saliency defining a degree of fixation on the object within the output image;
outputting the output image based on the visual saliency meeting a threshold; and
generating, using the generative image model, a new background image for the object based on the visual saliency falling below the threshold.

15. The system of claim 14, wherein the generating the prompt includes:
- querying a knowledge graph with the image tags, the knowledge graph indicating associations between entities; and
- extracting, using an entity extraction technique, one or more entities from the knowledge graph that correspond to the image tags, the prompt generated based on the one or more entities.

16. The system of claim 14, wherein the determining the visual saliency includes:
- generating, using the visual saliency model, a saliency map of the output image;
- determining, using the saliency map, a first degree of fixation on a region of the output image that includes the object, and a second degree of fixation outside the region of the output image; and
- determining the visual saliency of the object as a comparative measurement of the first degree of fixation relative to the second degree of fixation.

17. A non-transitory computer-readable medium storing executable instructions, which when executed by a processing device, cause the processing device to perform operations comprising:
- obtaining, from an online publication of an object, textual information describing the object;
- extracting, using an entity extraction technique, one or more entities that correspond to the textual information from a knowledge graph that indicates associations between entities;
- generating, using a generative text model, a prompt based on the one or more entities;
- generating, using a generative image model, a background image based on the prompt;
- generating an output image by incorporating the object into the background image;
- determining, using a visual saliency model, a visual saliency defining a degree of fixation on the object within the output image;
- outputting the output image based on the visual saliency meeting a threshold; and
- generating, using the generative image model, a new background image for the object based on the visual saliency falling below the threshold.

18. The non-transitory computer-readable medium of claim 17, wherein the textual information obtained from the online publication includes one or more of categories to which the object belongs, usages of the object, demographics the object is intended for, descriptions of the object, and reviews of the object.

19. The non-transitory computer-readable medium of claim 17, the operations further including:
- receiving training data including training textual information describing training objects and corresponding ground truth usages of the training objects;
- training, using supervised learning, a usage generation model to predict usages for objects based on the training data; and
- generating, using the usage generation model, a usage based on the textual information, the prompt generated based on the usage.

20. The non-transitory computer-readable medium of claim 17, wherein the determining the visual saliency includes:
- generating, using the visual saliency model, a saliency map of the output image;
- determining, using the saliency map, a first degree of fixation on a region of the output image that includes the object, and a second degree of fixation outside the region of the output image; and
- determining the visual saliency of the object as a comparative measurement of the first degree of fixation relative to the second degree of fixation.

* * * * *